United States Patent [19]

Schmidt

[11] Patent Number: 4,986,868
[45] Date of Patent: Jan. 22, 1991

[54] METHOD OF MAKING AN INTERMEDIATE BLANK FOR IDENTIFICATION CARD OR THE LIKE

[75] Inventor: Eric Schmidt, Elgin, Ill.

[73] Assignee: Wallace Computer Services, Inc., Hillside, Ill.

[21] Appl. No.: 423,734

[22] Filed: Oct. 17, 1989

Related U.S. Application Data

[63] Continuation of Ser. No. 238,576, Aug. 31, 1988, abandoned.

[51] Int. Cl.⁵ .................................... B32B 31/00
[52] U.S. Cl. ........................... 156/249; 156/289; 156/324; 40/630; 283/109
[58] Field of Search ............... 40/626, 628, 629, 630; 156/223, 226, 227, 289, 324, 204, 554, 249; 283/101, 106, 109, 110

[56] References Cited

U.S. PATENT DOCUMENTS

| | | | |
|---|---|---|---|
| 1,189,544 | 7/1916 | Cowden | 283/79 |
| 2,307,406 | 1/1943 | Howard | 156/554 X |
| 2,520,077 | 8/1950 | Wolowitz | 283/75 |
| 3,043,734 | 7/1962 | Porter | 156/299 X |
| 3,068,140 | 12/1962 | Biddle | 283/109 X |
| 3,069,793 | 12/1962 | Francescon | 283/904 |
| 3,574,023 | 4/1971 | Dickenherr | 156/204 X |
| 3,812,328 | 5/1974 | Tramposch | 283/904 |
| 3,899,381 | 8/1975 | O'Brien et al. | 156/204 |
| 3,945,870 | 3/1976 | Johnsen | 156/289 X |
| 4,425,182 | 1/1984 | Jones et al. | 156/554 |
| 4,429,015 | 1/1984 | Sheptak | 283/904 |
| 4,457,539 | 7/1984 | Hamisch | 283/80 |
| 4,545,838 | 10/1985 | Minkus et al. | 283/904 |
| 4,590,366 | 5/1986 | Rothfjell | 283/904 |
| 4,664,416 | 5/1987 | Steidinger | 156/289 X |
| 4,695,077 | 9/1987 | Pretre | 283/81 |
| 4,790,563 | 12/1988 | Instance | 283/81 |
| 4,815,768 | 3/1989 | Applebaum et al. | 283/67 |

FOREIGN PATENT DOCUMENTS 278207  8/1988  European Pat. Off. ............. 283/74

Primary Examiner—Michael W. Ball
Assistant Examiner—Mark A. Osele
Attorney, Agent, or Firm—Tilton, Fallon, Lungmus & Chestnut

[57] ABSTRACT

An intermediate blank for an I.D. card or the like and method of preparation in which a transparent web is equipped with a pressure sensitive adhesive on one surface thereof, half of the pressure sensitive adhesive having adhered thereto a ply of base stock such as paper for receiving printed indicia and the other half being equipped with a release liner whereby upon removal of the release liner, the now exposed adhesive equipped one half of the transparent web is foldable on itself to confine the paper ply.

6 Claims, 3 Drawing Sheets

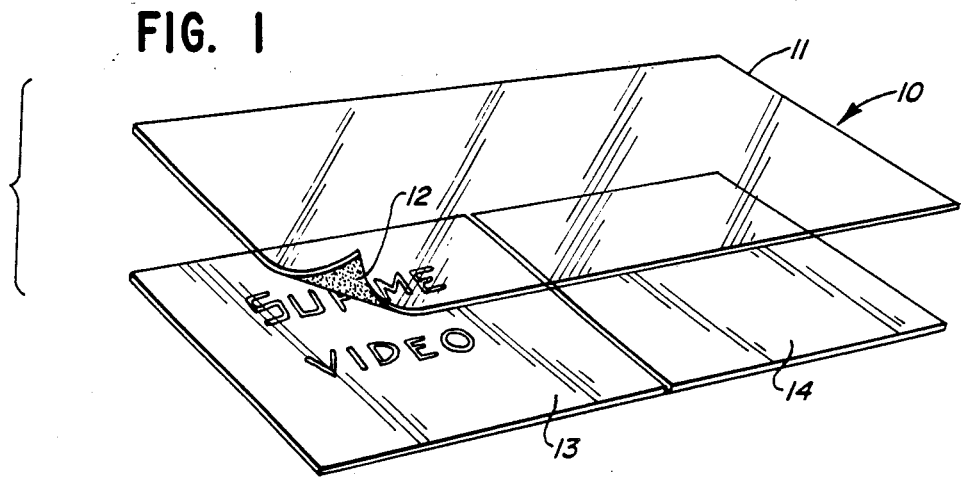
FIG. 1
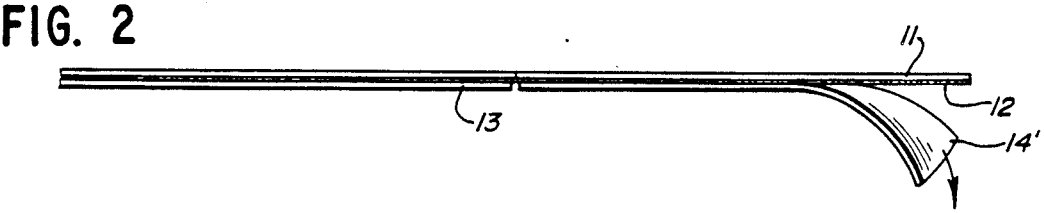
FIG. 2
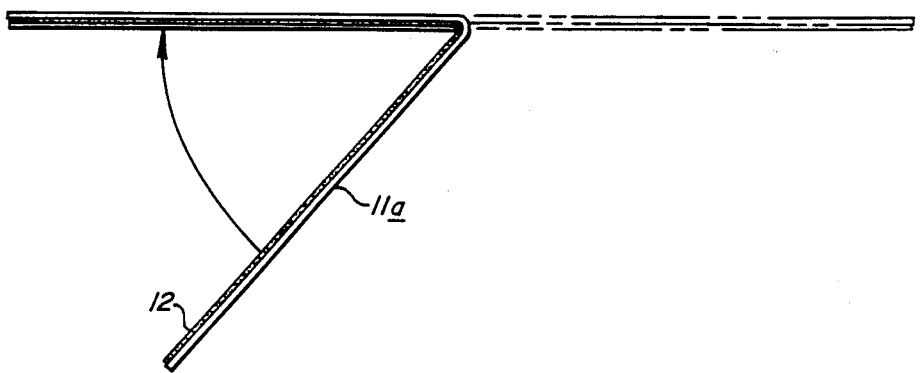
FIG. 3
FIG. 4
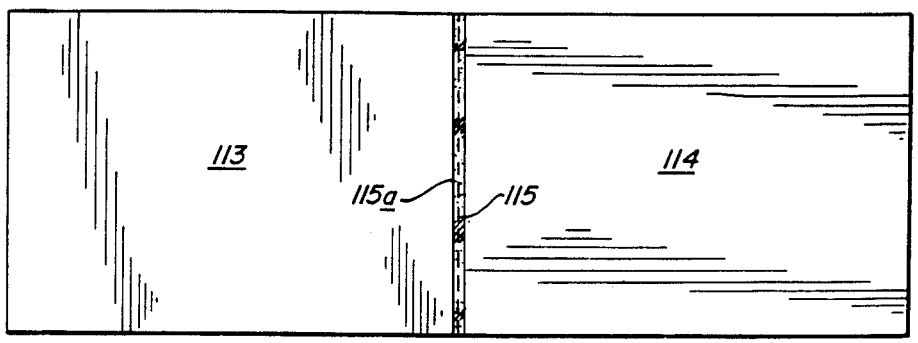

FIG. 5
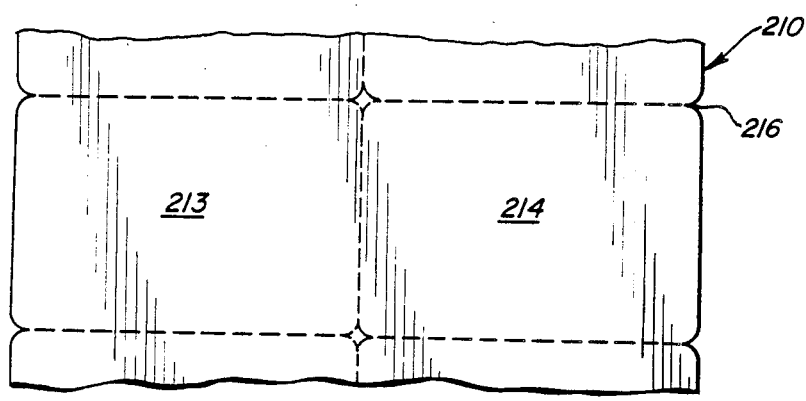
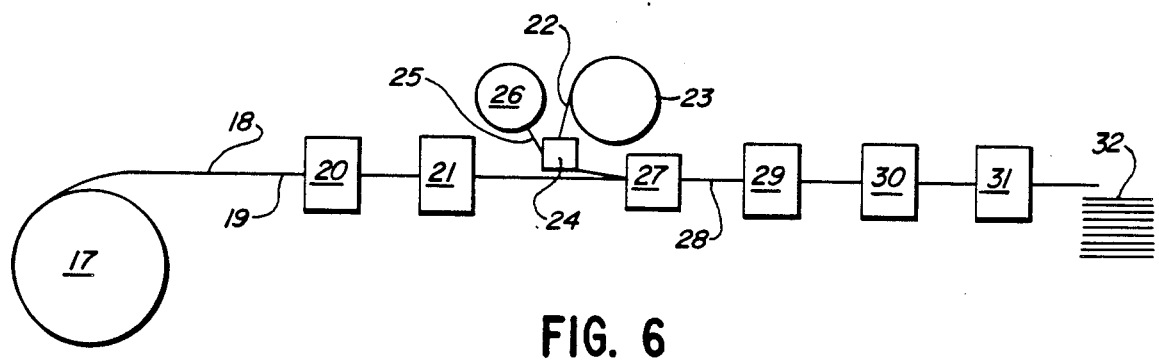
FIG. 6
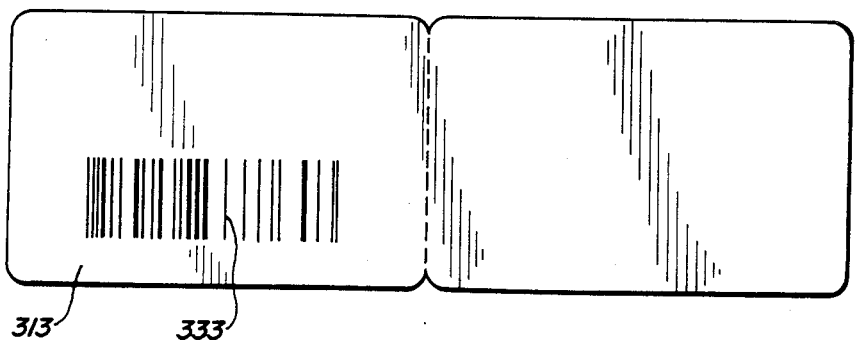
FIG. 7

METHOD OF MAKING AN INTERMEDIATE BLANK FOR IDENTIFICATION CARD OR THE LIKE

This application is a continuation of application Ser. No. 238,576, filed Aug. 31, 1988, now abandoned.

BACKGROUND AND SUMMARY OF INVENTION:

This invention relates to an intermediate blank for identification card or the like and method and, more particularly, to one that provides several significant advantages over the materials and methods used for conventional I.D. cards.

The inventive intermediate blank includes a transparent generally rectangular web of predetermined width and height dimensions and having one face thereof coated with a pressure sensitive adhesive. Adhered to this face is a base stock ply substantially covering the height and one side half of the width dimension. This provides an imaging portion on the surface of the ply remote from the surface confronting and adhered to the transparent web. The other side half of the width dimension of the transparent web is equipped with a release liner. When the release liner is removed, the transparent web is foldable on itself to cover and adhere to the base stock ply, thus providing a superior, less expensive I.D. card.

There are several benefits of this as compared to conventional I.D. cards. Typically identification cards are made of a plastic material whose cost is significantly greater than the sum of the materials used to produce the inventive card. Also the cost of manufacturing these "plastic" cards is much greater than the production for the inventive blank.

The use of plastic does not insure that the information imprinted on the card will not be altered or become illegible. The invention insures that the information is protected from alteration and from the environment. When producing I.D. cards with plastic material, a signature panel must be added so information such as a signature can be added. There is no need for that with the invention. One may write on the entire non-laminated side of the card.

As compared to an I.D. card produced from tag stock, this invention has advantages. The invention provides an I.D. card which has a laminate on the card stock to help prevent the card from being torn or otherwise made useless. The invention protects the information from alteration or from becoming illegible whereas on a tag stock, the information is exposed.

The invention is described in conjunction with the accompanying drawing, in which FIG. 1 is an exploded perspective view of an embodiment of the invention;

FIG. 2 is a side elevational view showing the release liner in the position of being removed;

FIG. 3 is a view similar to FIG. 2 but in a subsequent stage of usage wherein the exposed transparent web is now being folded on itself to envelope the card stock carrying the identification information;

FIG. 4 is a bottom plan view of another embodiment of the invention;

FIG. 5 is a fragmentary top plan view of the connected series of intermediate blanks made according to the teachings of this invention and featuring a further embodiment thereof;

FIG. 6 is a schematic side elevational view of equipment used in the practice of the inventive process; and FIG. 7 is a bottom plan view of the inventive intermediate blank in yet another embodiment thereof;

DETAILED DESCRIPTION

Figure 9:
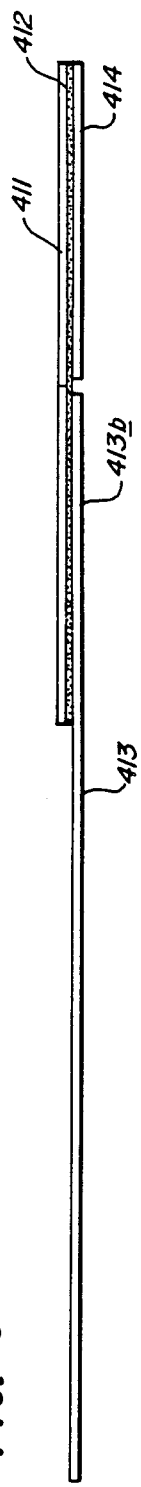
FIG. 9 is a side elevational view of FIG. 8.

In the illustration given and with reference first to FIG. 1, the intermediate blank is generally designated 10 and is seen to include a transparent web 11 which is equipped on its underside with a pressure sensitive adhesive 12. Underlying on one side of the generally rectangular web 11 is a ply 13 of base stock —— usually a paper stock such as tag stock. This occupies only one half the width of the card but extends substantially along the height dimension. Completing the underside of the blank is a release liner 14 which generally is silicon coated to protect the pressure sensitive adhesive.

In use, the blank 10 is imaged by the customer (e.g., signed, special coding, etc.). The liner 14 is then removed —— see FIG. 2 at 14' —— from the extended length of laminating stock, exposing the pressure sensitive adhesive. This extended length of clear laminating stock is folded over the non-laminated side of the card stock —— see FIG. 3 at 11a. This produces a fully laminated card and thereby protects the card and the variable information from alteration and the outside environment.

Several variations in construction are possible through the use of the inventive blank. The blank can be delivered in a cut sheet product, either individual card sizes or in sheets of cards, or in a folded pack, or in a rewound roll.

The card of FIG. 1 can be modified to improve performance and appearance. In FIG. 4, a construction is shown with a vertical perforation 115 added to aid in folding over the clear laminating material onto the card. Exaggerated as at 115a is the gap between the base stock 113 and the release liner 114. As will be appreciated from a description of the method of making the intermediate blank hereinafter, sufficient of the release liner is slit and removed from the transparent web to accommodate the base ply 113 and the tolerance developed by the slitting necessarily provides a small gap 115a.

The construction of FIGS. 1 or 4 can be modified to conform with a more standard appearance for an I.D. card. A card developed from a connected series of blanks designated 210 and including the base ply 213 and release liner 214 is equipped with rounded corners as at 216. These rounded corners are provided utilizing a punch station as will be described hereinafter with respect to FIG. 6.

The Method of Manufacture

Referring now to FIG. 6, a roll of card stock material 17 is provided which is unwound to provide a ply 18 ultimately constituting the base stock ply 13. The web or ply 18 is advanced along a predetermined path 19 through various print stations 20 for front and back printing.

The web optionally can be imaged with variable information if desired in print station 21.

The web of clear laminating material 22 (complete with fully coextensive release liner) is unwound from roll 23. The web 22 is passed through a slitting unit 24 where the liner of the laminate material is slit but the clear laminating face stock or transparent web is not slit. A half 25 of the slit liner web is stripped off the clear laminating material and rewound for disposal in the roll 26. This exposes the pressure sensitive adhesive on one half of the web 22 which is then laminated to the card stock ply 18 in the laminating station 27. The web 28 has one surface equipped with pressure sensitive adhesive and, to this surface, are adhered on one side the base stock ply 18 and to the other side the remainder of the release liner.

After the web 28 has been created by laminating pressure in the station 27, it passes through the processing station of a press or the like for punching round corners as at 29 and/or vertical perforating to aid in folding over in station 30. Transverse perforation for folding or cutting off for sheeting can be performed at station 31. This results in a stack of intermediate blanks which can be individual, multiple, or zig-zag folded as at 32, or rewound into a roll as previously indicated.

Yet another variation in construction or usage is seen in FIG. 7 where the addition of variable information —— such as a bar code or a specific number is provided on the pre-laminated side of the card. For example, a bar code 333 is provided on the side of the base stock ply 313 facing the transparent web. This variable information is printed or encoded at the time of manufacture and prior to laminating on the press or other manufacturing machine schematically illustrated in FIG. 6. The advantage of this type of information is that it permits customers to protect information from damage or alteration while en route to or from a customer's customer.

Figure 8:
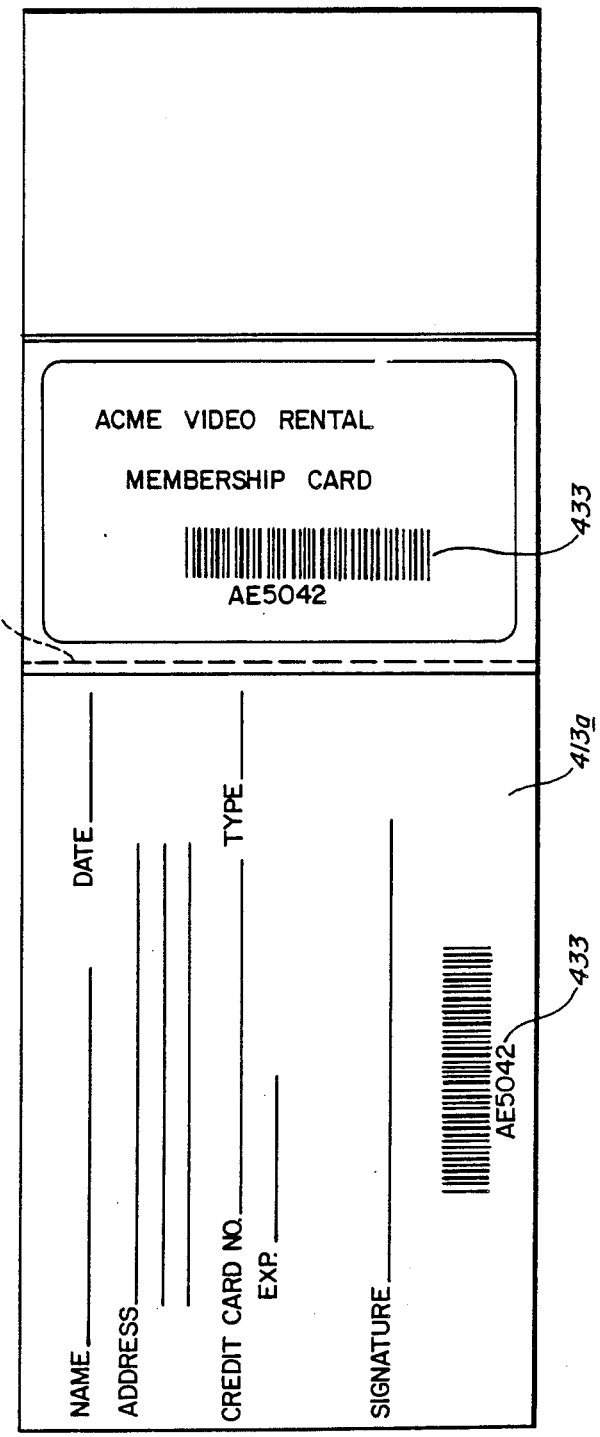
FIG. 8 is a bottom plan view of still another embodiment.

Still another variation is seen in FIGS. 8 and 9. Here the base or card stock ply 413 is elongated to provide a file record 413a so as to record data in the issuing business's file. There are matching bar codes 433 on the file card and identification card.

The card holder's information is completed on the file card 413a and signed. The identification card 413b is then signed after which the release liner 414 is removed. This exposes the pressure sensitive adhesive 412. The clear laminate or transparent web 411 is then folded over to seal the signature side of the card. The card portion 413b is then torn off at the line of perforation 415.

Only a slight modification is required in the arrangement seen in FIG. 6 to produce the embodiment of FIGS. 8 and 9. The base stock ply 13 is made wider to provide the file record 413a. The card holder's card 413b is now arranged with its lengths parallel to the direction of processing —— see the direction arrow in FIG. 8 and compare it with the direction arrow in FIGS. 5 and 7.

While in the foregoing specification a detailed description of the invention has been set down for the purpose of illustration, many variations in the details hereingiven may be made by those skilled in the art without departing from the spirit and scope of the invention.

I claim:

1. A method for preparing a series of connected intermediate blanks for identification cards or the like comprising:

advancing a base stock web along a predetermined path;

providing a composite web including a transparent layer, a release liner layer, and a pressure sensitive adhesive disposed between the transparent and release liner layers;

removing a predetermined width of the release liner layer along one edge of the composite web to expose the pressure sensitive adhesive between the removed portion of the release liner layer and the transparent layer;

introducing the composite web into said path in overlapping relation with the base stock web, said base stock web being disposed in side-by-side relation with the remaining portion of the release liner layer; and pressing said composite web and base stock web together to bond the webs together to provide said connected series.

2. The method of claim 1 further comprising perforating the connected series transversely of the path to facilitate folding and detachment.

3. The method of claim 1 further comprising perforating the connected series longitudinally of the path.

4. The method of claim 1 in which said base stock web is imprinted in said path prior to said composite web being superposed thereon.

5. The method of claim 1 in which the assembly of said base stock web and said composite web are transverse and longitudinally perforated to provide a connected series of blanks having generally rectangular base stock and liner portions.

6. The method of claim 5 in which said assembly is punched to provide rounded corners on said base stock and liner portions.

* * * * *